Patented May 6, 1952

2,595,911

UNITED STATES PATENT OFFICE 2,595,911

PARAFFIN WAX-STYRENE ISOBUTYLENE COPOLYMER COMPOSITION

David W. Young, Roselle, and William J. Sparks, Cranford, N. J., assignors to Standard Oil Development Company, a corporation of Delaware No Drawing. Application December 29, 1944, Serial No. 570,484

2 Claims. (Cl. 260—28.5)

This invention relates to improved wax composition and new methods of preparing and using same, and more particularly it relates to the incorporation of a small amount of a particular type of copolymer plastic into a wax such as paraffin wax in order to improve the properties of the latter for use in coating and impregnating fibrous materials such as paper, cloth, etc., and for various other purposes. The particular type of copolymer used in this invention belongs to the general class of copolymers of a polymerizable hydrocarbon containing a cyclic nucleus and an alipatic olefin, as for example a copolymer of styrene and isobutylene.

U. S. Patent 2,274,749 describes copolymers of the general type referred to above, such as copolymers of styrene and isobutylene, and methods of preparing same such as copolymerizing the reactant at a temperature below about 0° C as for instance —20° C., —40° C., —80° C. or even lower, with the use of an active halide catalyst such as boron fluoride or aluminum chloride and the like, with or without substances such as propane, ethylene, chlorinated hydrocarbon or other liquid or gaseous substances serving as diluents, solvents or refrigerants. It is said that by adjusting the proportions of the two raw materials, copolymers of desired hardness, melting point, plasticity, etc. may be obtained.

Instead of isobutylene, other aliphatic olefins may be used, preferably having more than 2 carbon atoms and preferably iso-olefins having 4 to 8 carbon atoms, such as isopentene, (methyl-2 butene-1) or a pentene obtained by dehydration of secondary amyl alcohol. Instead of styrene, other materials may be used such as indene, terpene, alpha methyl styrene, para methyl styrene, alpha methyl, para methyl styrene, etc. After completion of the copolymerization, residual catalyst is removed by washing the product with water and preferably also with a dilute water solution of NaOH. The resulting solid copolymer may range from a relatively stiff plastic mass to a resinous solid, depending upon the temperature of polymerization and the proportion of cyclic reactant in the feed. The molecular weight of the product will generally range from about 800 upwards, as for instance, 5,000, 40,000, 100,000, 300,000 or more.

For convenience and brevity, the above described copolymer of a cyclic polymerizable material and an olefin will be referred to as cycalkene copols, or more simply cycalkenes. The specific type of copolymer made from styrene and isobutylene will similarly be referred to for brevity as simply stybutene. The invention will be illustrated as applied particularly to stybutene, although it is not to be limited specifically thereto.

The above mentioned patent makes a general suggestion that such copolymers may be mixed with mineral or ester waxes, and undoubtedly certain of those copolymers, particularly of those of relatively low styrene content and low intrinsic viscosity as are obtained by copolymerization at temperatures in the range of —10° C. to —45° C., are very useful for increasing the adhesiveness or tackiness of a paraffin wax intended for use as a bonding agent in a laminated treat material and for other purposes. However, it has been found that many of the different types of copolymers which can possibly be made within the broad disclosure of the patent referred to above, cannot be used satisfactorily in wax compositions made or used at a temperature above the melting point of the wax, because many of such copolymers separate out from a molten wax and therefore produce a non-homogeneous composition.

It has now been found that within the broad class of copolymers described above, copolymers having new critical and unexpected properties, particularly in regard to heat stability and solubility in or compatability with molten aliphatic waxes such as paraffin wax, are obtained as several different manufacturing conditions are simultaneously controlled during the copolymerization, as will be herein described.

Broadly, the invention comprises compounding with an aliphatic wax a cycalkene copolymer having an intrinsic viscosity of at least 0.6 and containing not more than 30% of combined cyclic constituents. Such copolymers can be suitably prepared only at temperatures below about —50° C., e. g. —55° C., —78° C. (such as Dry Ice temperature), —103° C. (the boiling point of liquid ethylene), or even lower. Copolymers are preferred which contain about 5% to 20% of combined cyclic constituents. The copolymers used according to this invention are completely soluble in petroleum naphtha and in liquid aliphatic hydrocarbons such as a normal hexane, at room temperature, and dissolved in molten paraffin wax to form a homogeneous solution therein.

The preferred method of carrying out the copolymerization is to use a lower alkyl halide such as methyl chloride or ethyl chloride or a bromo chloro fluoro derivative of ethane or ethylene (with a melting point below —60° C.) as a solvent-diluent, for instance, using 2 to 4 volumes of methyl chloride for each volume of mixed hydrocarbon reactants. This entire mixture is then cooled down to the desired temperature either by external refrigeration or by the use of liquified ethylene or other suitable internal refrigerants, and as the catalyst is added, which is preferably a solution made by dissolving boron tri fluoride gas in methyl chloride at −23° C. until the solution is saturated, or the catalyst may be a solution made by dissolving aluminum chloride in methyl chloride at room temperature and then cooled it down. Other catalysts known to the art may also be used.

After hydrolysis and removal of catalysts and washing the products with water, the resulting copolymer may have a texture ranging from a rough and slightly sticky plastic solid having an intrinsic viscosity of about 0.6 and 1.0 or so to a very much higher molecular weight substantially dry or non-tacky rubbery solid having a much higher intrinsic viscosity in the range of 2.0, 3.0 or 8.0 or higher. These copolymers are all substantially colorless, and in a thin film are almost perfectly clear and transparent. Although their physical texture may vary to a certain extent according to their preparation, all those staying within the limits described have the critically necessary solubility in molten paraffin wax.

The proportions in which the cyclic constituents and the olefin have actually combined during the copolymerization may be determined by interpretation of a carbon-hydrogen analysis between the limits of the two respective constituents, as for instance between the following maximum and minimum limits for a stybutene copolymer:

|  | Carbon | Hydrogen |
| --- | --- | --- |
|  | Percent | Percent |
| Pure styrene | 92.3 | 7.7 |
| Pure isobutylene | 85.7 | 14.3 |

Generally the molecular weight of the product will range from about 12,000 upwards, for instance, 50,000, 100,000 or much higher, the higher molecular weights and higher intrinsic viscosity being obtained with lower temperature of copolymerization and lower content of cyclic reactant.

The other primary constituent of the finished compositions of this invention, namely the wax, may be selected from a wide variety of available natural and synthetic aliphatic wax, of which one of the most readily available and very suitable ones is a paraffin wax which may have a melting point between the approximate limits of 110° F. to 195° F. or higher, those having a melting point between about 120° F. and about 145° F. being commonly available commercially. Instead of using a paraffin wax which is a crystal wax, one may use amorphous such as petrolatum or deoiled petrolatum often referred to as microcrystalline wax. Instead of the above several hydrocarbon waxes one may also use other essentially aliphatic waxes which may contain a small amount of oxygen which may be present in the form of an ester, carboxyl, hydroxyl, etc. groups, such as in the case of carnauba wax, and hydrogenated castor oil, etc. The above types of wax, or mixtures thereof e. g., a mixture of paraffin wax and petrolatum or paraffin wax and carnauba wax, may be used either in a relatively highly refined state such as after having been sweated or recrystallized one or more times or after subjection to acid treatment, clay treatment etc., or they may be used in a crude form, providing the small proportions of impurities present are not harmful for the purposes for which the finished composition is intended to be used.

The proportions in which the two primary constituents of this invention namely the wax and the cycalkene copolymer are to be used, will of course vary to a certain extent depending upon the intrinsic viscosity of the latter, as well as upon the other physical characteristics of these two constituents, and also upon the intended use of the compositions, but normally will range from about 0.1% to 50%, and preferably about 1% to 20% of the copolymer.

It should also be understood that minor amounts of other optional additives may be used as for instance 0.1% to 5% of a plasticizer or smoothifier e. g. zinc stearate, which should not be used for food containers but may be used for making waxed paper for other purposes, or a small amount of a tackifier, e. g. 0.1% to 10% of a polybutene having an average molecular weight of about 5,000 to 200,000, or a small amount of a tensile strengthener e. g. 0.1% to 3% or preferably 0.2% to 1% of natural or synthetic rubber, or small amounts of other improving agents such as polylauryl methacrylate, etc., as well as small amounts of other additives known to the art such as dyes, pigments, antioxidants, e. g. barium diisobutyl phenol sulfide, calcium sulfonates [Ca(SO$_3$R)$_2$], diorthotertiary butyl derivative of para cresol, or addition agents such as penta chloro phenol, or polysilicon, such as —Si(CH$_3$)$_2$—O—Si(CH$_3$)$_2$—O—Si(CH$_3$)$_2$—O, clays, de-ashed, cyclized natural rubber, polymethyl pentadiene, cyclicized polymethyl pentadiene etc.

Although various methods may be used for compounding the above described ingredients of the compositions of this invention, the preferred method is to stir or knead the copolymer either directly into the molten wax, maintained either at the melting point or not more than a slightly higher temperature, or to first knead a relatively small proportion e. g. 10% to 50% of the wax, preferably in a softened or even fluid condition into a relatively major proportion of the copolymer on a hot roll mill to prepare a master batch containing about 50% to 90% or so of the polymer, and then stir or knead the required amount of the latter into molten wax to prepare a finished composition containing the desired proportions of wax and polymer. This latter method has the advantage that it permits making a homogeneous finished composition with the least amount of heating of the major proportions of the wax, and this is further advantageous for maintaining the highest tensile strength and other characteristics of the wax.

One advantage of the present invention is that the incorporation of the particular type of copolymer used effects a very substantial increase in tensile strength of the wax, and another advantage is that it greatly improves the moisture resistance of thin films of sheets of the wax. Still other properties of the wax are improved such as the flexibility characteristics, particularly at low temperature. Also, the polymer is the only one now known that can be held in wax at 285° F. to 300° F. for several hours without showing loss in viscosity. In other words the polymer has great thermostability.

The wax-copolymer compositions of this invention are particularly adapted for coating paper or other fibrous sheet material such as cloth etc., either by a hot melt dipping or roll-contacting process, or by spray coating, or if preferred, the wax-polymer composition may first be dissolved in a volatile solvent such as a light petroleum naphtha or a slightly heavier refined naphtha such as a Varnolene, and then the resulting solution is applied to the paper, cloth, metal, wood, or other suitable base, either by dipping, spray coating, roll contacting, or application with a brush or any other suitable method, after which the volatile solvent may be permitted to evaporate or may be evaporated more quickly by the application of heat and/or vacuum, with or without recovery of the solvent for re-use.

Paper or other flexible fibrous sheet material coated or impregnated with the compositions of this invention may be used as wrapping material, and is particularly suitable for wrapping foods such as bread, pastry, fruits and vegetables, cheese etc., to prevent drying thereof as well as for wrapping or making containers for other relatively drier foods such as breakfast cereals, salt, dehydrated foods, to prevent them from absorbing moisture, or for making a moisture barrier for other purposes.

These improved wax compositions may also be used as corrosion resistant coating compositions for metal e. g. as a coating or lining for beer cans, iron or steel pipes, etc. Paper, cloth etc., the interstices of which are completely filled with the wax-polymer compositions of this invention are particularly suitable for electric insulation purposes for instance as the dielectric material in electric condensers, or as an insulating medium for wrapping electrical conductors such as wires, cables etc., because the particular type of stybutene copolymers used according to this invention have exceedingly favorable electrical insulating characteristics, and also the physical properties of these copolymers greatly improve the physical properties of the wax and electrical insulation purposes. Although these wax-polymer compositions are particularly suitable for coating and impregnating purposes as described above, they may also be used for making molded articles such as candles, dolls, etc.

The compositions of this invention have another unexpected advantage namely, that they may be satisfactorily extruded into various forms such as tubes, etc.

The invention will be better understood from a consideration of the following examples.

EXAMPLE 1

Pure styrene (80 ml.) was added to 800 ml. of 99% liquid isobutylene. This olefin solution was then placed in a copper reactor with 2000 ml. of pure methyl chloride. The copper reactor was jacketed with liquid ethylene as refrigerant. When the temperature of the "olefin–MeCl" solution was —103° C., about 400 ml. of AlCl₃-MeCl catalyst was added. The concentration of AlCl₃ in the MeCl was 0.8%. The catalyst was added at a rate of 200 ml. per minute. The methyl chloride-olefin solution was agitated as the catalyst was added. After a period of 12 minutes the catalyst was killed in the reaction by the addition of 30 ml. of isopropyl alcohol. Then the copper reactor was removed from the bath of liquid ethylene and the polymer.

A 3% blend of the polymer prepared as described above, which had an intrinsic viscosity of about 0.98 and was a white plastic solid, was made by dissolving the polymer in a molten paraffin wax at about 130° F. The wax used had a melting point of about 130° F. To facilitate solution, the polymer was cut into small pieces (about ⅛" in size, and allowed to dissolve in the wax for several hours. When the solution was clear the wax polymer blend was coated at about 135° F. on glassine paper. The pounds per ream of wax polymer was 8.0. The thickness of wax polymer on paper was 0.0017". This paper was tested for water vapor permeability by the use of TAPPI Tentative Standard T448 M–40. Results are given in the following table.

*Water vapor permeability of coating on glassine*

| Material | Water Vapor Permeability[1] |
|---|---|
| Plain Wax | 1.84 |
| 3% Stybutene in Wax | 0.8 |

[1] Grams of moisture passing through 1 sq. meter of the material every 24 hours at 25° C. from 65% relative humidity on one face to desiccant in contact with the other.

The above data shows that the addition of only 3% of the copolymer to the wax effected a very great reduction in the moisture vapor permeability of the latter.

EXAMPLE 2

Another stybutene copolymer was prepared from a polymerization feed consisting of 1,000 ml. liquid isobutylene, 4,000 ml. of liquid ethane, 20 ml. of styrene, 1 ml. of ethyl ether as a promoter, and then after cooling this reaction mixture —89° C., BF₃ gas catalyst was bubbled through the mixture. The reaction was fast, and after about 3 minutes residual catalyst was hydrolyzed by adding about 20 ml. of ethyl alcohol, and then the copolymer which was a white plastic solid, amounting to a yield of about 94%, was washed with water and then dried by heating to about 50° C. This copolymer had an intrinsic viscosity of about 0.85 and a molecular weight, according to the Staudinger method, of 28,990. It contained about 2% by weight of combined styrene, and had excellent solubility in molten paraffin wax.

A wax blend was prepared by dissolving 3% by weight of this copolymer in a paraffin wax having a melting point of 130° F., and the resulting blend was tested in comparison with the plain wax in regard to various physical properties alone and as a moisture resistant coating on glassine paper, using 2.8 pounds of coating per ream (3,000 square feet). The results of these tests were as follows:

| | Viscosity (Sec. Saybolt at 210°F.) | Tensile Strength, lbs./sq. in. | Moisture Vapor Permeability[1] g.H₂O/sq.m./ 24 hrs. |
|---|---|---|---|
| Wax | 37 | 228 | 4.9 |
| Wax + 3% Copolymer | 78 | 324 | 1.8 |

[1] Measured at 50% relative humidity at 25° C., by TAPPI method (Tech. Assoc. of the Pulp and Paper industry Tentative Standard T 448 m–40).

The above data show that the addition of the polymer to the wax made a substantial increase in the viscosity, almost a 50% increase in tensile strength, and made a very great reduction in the moisture vapor permeability of the wax when coated on paper.

This same stybutene copolymer containing slightly less than 2% by weight of combined styrene, was blended in various small concentrations ranging from 0.25% to 2.5% in a similar paraffin wax having an ASTM melting point of 130° F., and the resulting blends were tested, in comparison with the plain wax as a coating, for sealing strength for bonding paper.

The sealing strength of wax is determined by sealing two strips of waxed paper with a hot iron and cutting them to a uniform size of 2½" x 1". The sealed papers are separated by hand for ½" and the split ends inserted in the jars of the pendulum-loaded Thwing-Abbet Research Tearing Tests. On releasing the pendulum the jar fixed on it peels its piece of paper from the paper held by the unmovable jar. The pendulum is calibrated to show the degrees of force necessary to peel the one inch strips apart from a two inch long seal. The results of these tests were as follows:

| Per Cent Copolymer in Wax | Sealing Strength[1] (dynes/2 sq. in.) |
|---|---|
| 0 | 26 |
| 0.25 | 30 |
| 0.5 | 31 |
| 0.75 | 31 |
| 1.25 | 32 |
| 2.5 | 35 |

[1] Paper bond seals: 1" wide—pull down through 2" of seal, at 77° F.

These sealing strength tests show that even a very small addition of the copolymer effected a very substantial increase in the sealing strength of the paraffin wax for use in bonding paper.

It is claimed:

1. Composition comprising 97% to 99.75% of paraffin wax having a melting point between 110° F. and 195° F., having homogeneously dissolved therein 0.25% to 3% by weight of a high molecular weight solid styrene-isobutylene copolymer having a combined styrene content of about 2% by weight, and having an intrinsic viscosity of 0.6 to 3.0.

2. Composition consisting essentially of 97% by weight of paraffin wax having a melting point of 130° F., having homogeneously dissolved therein 3% by weight of a solid styrene-isobutylene copolymer having a combined styrene content of about 2% by weight, and having an intrinsic viscosity of about 0.85 and a Staudinger molecular weight of 28,990, said composition having, in comparison with said paraffin wax alone, substantially better heat stability in the molten state, better tensile strength, better sealing strength, and better resistance to moisture vapor penetration.

DAVID W. YOUNG.
WILLIAM J. SPARKS.

REFERENCES CITED

The following references are of record in the file of this patent:

UNITED STATES PATENTS

| Number | Name | Date |
|---|---|---|
| 2,227,516 | Soanes | Jan. 7, 1941 |
| 2,274,749 | Smyers | Mar. 3, 1942 |
| 2,275,814 | Abrams et al. | Mar. 10, 1942 |

OTHER REFERENCES

Slotterbeck et al., Official Digest #240, Nov. 1944, pages 511–516.